INVENTOR
CLARENCE JOHNSON

May 16, 1961  C. JOHNSON  2,984,116
CONTROL VALVE OPERATING LEVER BRACKET
Filed May 11, 1955  5 Sheets-Sheet 2
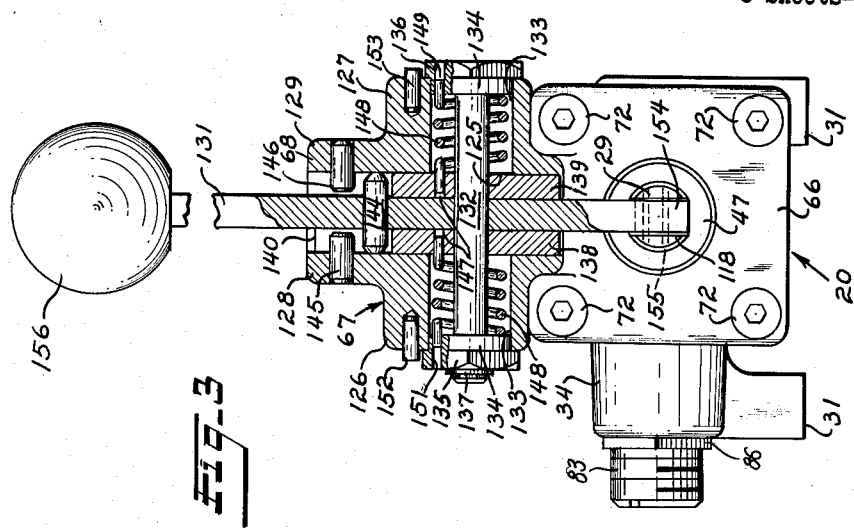
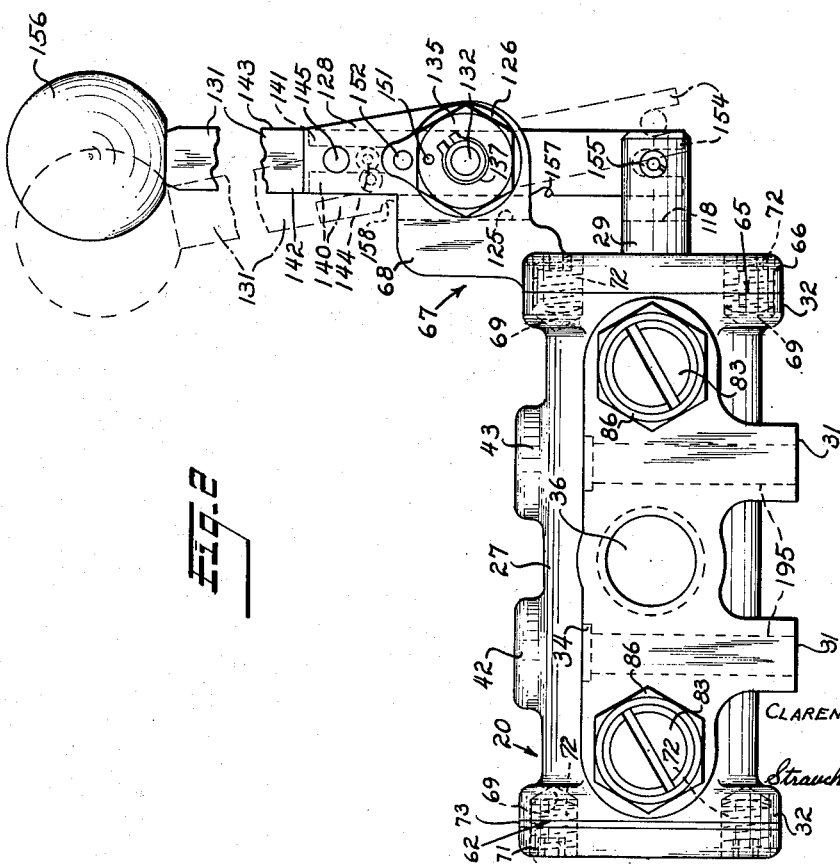
INVENTOR
CLARENCE JOHNSON
ATTORNEYS May 16, 1961  C. JOHNSON  2,984,116
CONTROL VALVE OPERATING LEVER BRACKET
Filed May 11, 1955  5 Sheets-Sheet 3

INVENTOR
CLARENCE JOHNSON
BY Strauch, Nolan & Diggins
ATTORNEYS

May 16, 1961  C. JOHNSON  2,984,116
CONTROL VALVE OPERATING LEVER BRACKET
Filed May 11, 1955  5 Sheets-Sheet 4
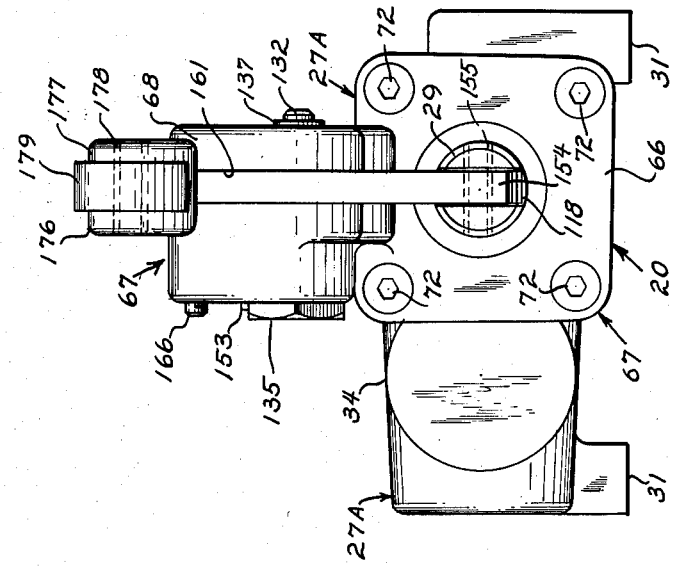
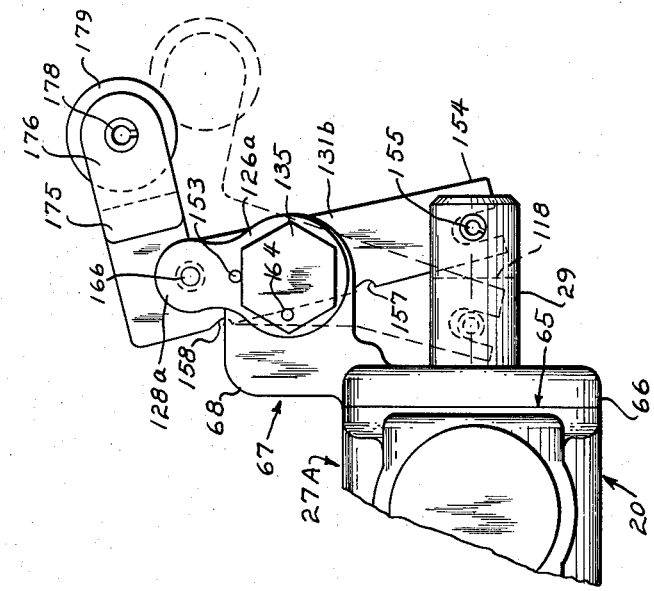
INVENTOR
CLARENCE JOHNSON
BY *Strauch, Nolan & Diggins*
ATTORNEYS

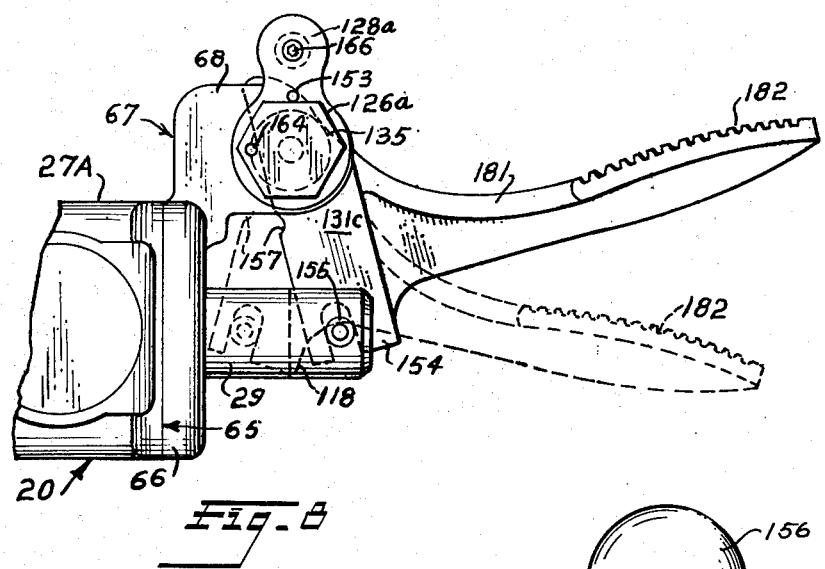
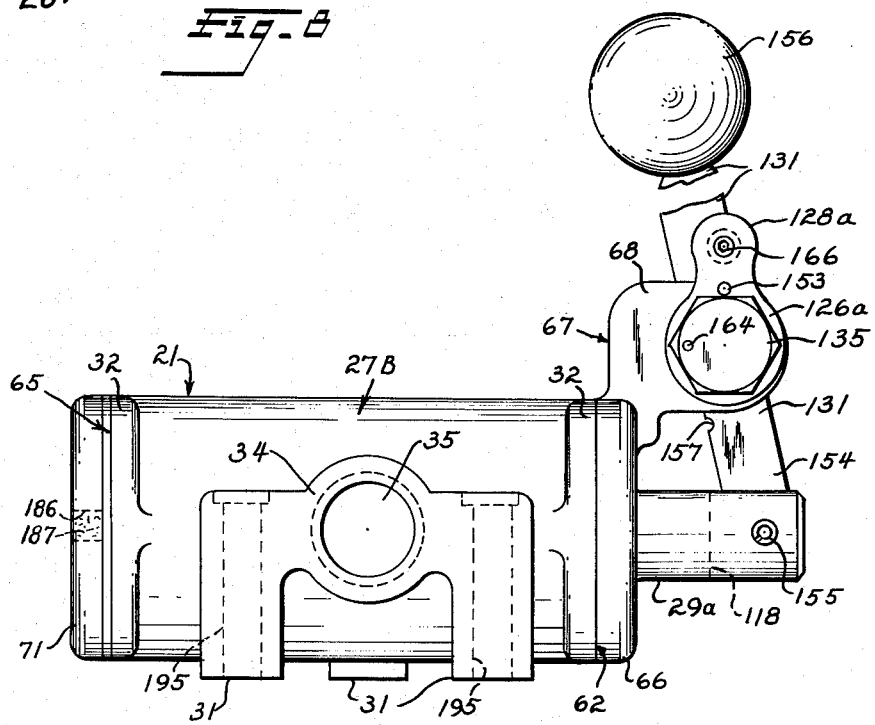

United States Patent Office 2,984,116
Patented May 16, 1961

2,984,116

CONTROL VALVE OPERATING LEVER BRACKET

Clarence Johnson, 1804 Green Road,
South Euclid 21, Ohio

Filed May 11, 1955, Ser. No. 507,533

4 Claims. (Cl. 74—104)

The present invention relates to control valves and more particularly to lever operated spool valves for controlling the supply of fluid to the servo-motors used in servo-motor powered production equipment. This application is a continuation-in-part of copending application Serial No. 348,942 of Clarence Johnson, entitled Valves, filed April 15, 1953, now Patent No. 2,912,007.

While control valves designed for servo-motor control usage have heretofore been proposed, the prior control valves have been more or less special design or "tailor made" valves designed for a particular usage. As a consequence, the prior proposed valves have been relatively expensive and not suited for quantity production.

A primary object of this invention, therefore, resides in the production of spool control valves of various sizes having different passage arrangements from a minimum number of basic quantity production elements to provide valves suitable for specifically different control systems and a novel method of making such valves to minimize the inventory of parts to be stocked by the manufacturer.

Still another object of the present invention resides in providing a sliding spool type valve with a detachable valve operating assembly which may be mounted in any one of a multiplicity of relative positions on the valve housing and may be selectively provided with one of several operating lever mechanisms to selectively adapt said control valve for hand operation, foot operation, or cam operation as may be desired.

A still further object of this invention is to provide a control valve of the character heretofore mentioned in which the spool valve element is spring biased to a selected normal position.

Another object of this invention is to provide a control valve of the character heretofore mentioned with a simple and inexpensive operating assembly adapted for selective use on any one of several different types of valves.

Still further objects of the present invention will appear from the following description and appended claims when read in conjunction with the accompanying drawings wherein:

Figure 2 is an elevational view of a preferred form of four way valve similar to but longitudinally shorter than the valve of Figure 1 illustrating a specifically different and preferred form of hand actuated operating assembly;

Figure 3 is an end view of the valve of Figure 2 viewed from the right end, certain portions of the hand actuated operating assembly being shown in section;

Figure 6 is a fragmental side view of a four way valve like that of Figure 4 equipped with a cam operator in place of the hand lever of Figure 4;

Figure 7 is an end view of the valve and operator of Figure 6 viewed from the right hand end of Figure 6;

Figure 8 is a fragmental side view similar to Figure 6 illustrating the valve of Figure 6 equipped with a foot pedal operator; and Figure 9 is a side view of a three way valve made in accordance with this invention viewed from the inlet side or side opposite that of the previous figures showing a hand operator like that of Figure 2 mounted on the opposite end of the valve.

Figure 1:
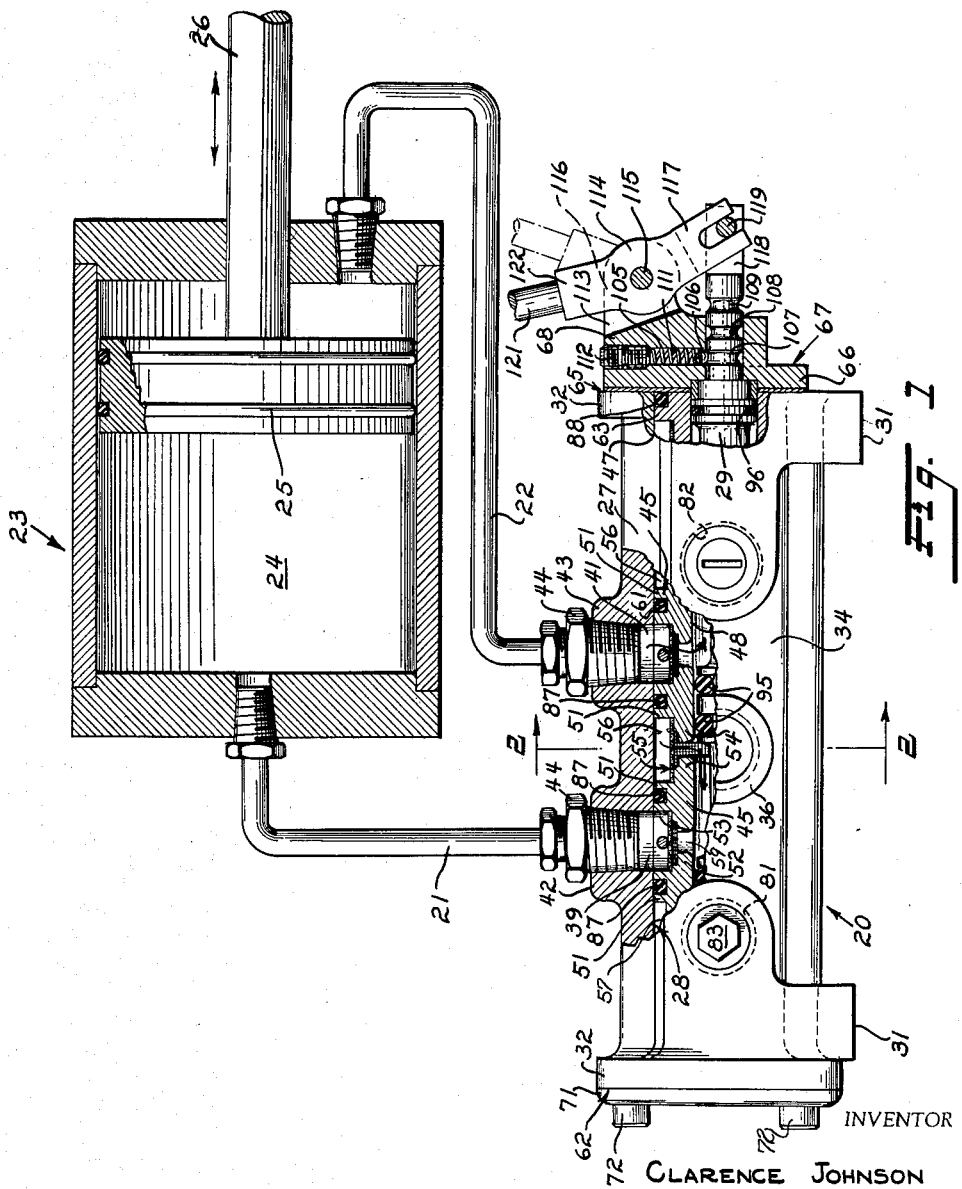
Figure 1 is an elevational view of one embodiment of a four way valve embodying certain of the improvements of this invention shown installed in a diagrammatically illustrated servo-motor system and adapted for hand operation.

With continued reference to the drawings wherein like reference numerals are used throughout to indicate the same parts and with particular reference for the moment to Figures 1 and 2, a four way valve 20 made in accordance with the present invention is illustrated connected through pipe lines 21 and 22 to a servo-motor 23. While control of servo-motor 23 as illustrated is one use for the valves of this invention, it will be appreciated that the valves may be connected to other servo-motor mechanisms or similar devices in various ways to accomplish desired control functions. As illustrated, servo-motor 23 comprises a cylinder 24 and a double acting piston 25 disposed therein for reciprocating movement. The piston rod 26 is connected in any conventional manner to a machine tool table, tool, cross slide or the like or any other device adapted to be moved at a controlled rate as will be clear to those skilled in the art.

While valve 20 may be actuated automatically or manually, the present invention contemplates a readily separable lever type operator of any one of several different types and a unique body and spool structure adapting such control valves for quantity production in spite of the customary special operating functions. To this end, valve 20 comprises a valve body or housing 27 of generally elongated form having a longitudinally extending bore or passage 28 adapted to receive separable liner sleeves for slidingly supporting a valve member in the form of a reciprocating spindle 29. While body or housing 27 may be supported in any suitable way, each of the illustrated embodiments embodies support feet 31 adapting the body for bolted attachment to a mounting plate or the like (not shown) in a manner well known to the art.

To effect manufacturing and inventory economies, the present invention proposes to eliminate as far as possible the need for different valve housings in the standard ¼", ⅜" and ½" three and four way valves and the need for careful machine fitting of the valve parts in all types and sizes of valves. To this end, the same housing 27 is employed in the four way valves of the ⅜" and ¼" sizes (Figures 1-3 and 5), a similar housing 27A having a wider body (Figures 4, 6, 7, 8) is used in the four way valves of ½" size, a different housing 27B (Figure 9) is used for the three way ½" valves, a similar but narrower body (not shown) is used for the three way valves of the ⅜" and ¼" sizes, and a similar but shorter housing is used for the two way valves. The basic housings in all cases are produced in block form. All of the bodies are of generally elongated form and are preferably provided with end flanges or faces 32 of identical shape and size (Figures 2 through 9) adapting any one of the bodies for reception of any one of the operating assemblies hereinafter described. The four way valve bodies in the ¼", ⅜" and ½" sizes are provided with a laterally offset, longitudinally directed, body formation 34 along one side to provide for the desired exhaust porting.

In all of the four way valves, the valve bore 28 and inlet port 35 longitudinally centered along the side opposite formation 34 are drilled and tapped to the desired size at the time an order for a particular size valve is received. Each of these bodies has a cored exhaust port 36 tapped to size and arranged diametrically opposite the inlet port and a cored manifold passage extending longitudinal of body formation 34 and terminating short of the body ends and intersecting the exhaust port 36 formed in the body formation 34. Bore 28 connects with the opposite ends of manifold passage through drilled passages. In the ½" four way valves, formation 34, due to the necessarily larger diameters of bore 28 and manifold passage required to handle the greater fluid flow, is substantially larger than in the ¼" and ⅜" bodies (see Figures 4 and 6 through 9).

In the three way valves, the formation 34 and manifold passage are omitted and a pair of longitudinally spaced drilled and tapped outlet ports 38, symmetrically disposed at either side of the longitudinal center of the body, are provided at the same time that bore 28 is drilled. In the two way valves, the inlet port 35 and an outlet port 38, offset and located on opposite sides of the valve body, are drilled and tapped to the desired size at the same time that the bore 28 is drilled.

Figures 4, 5:
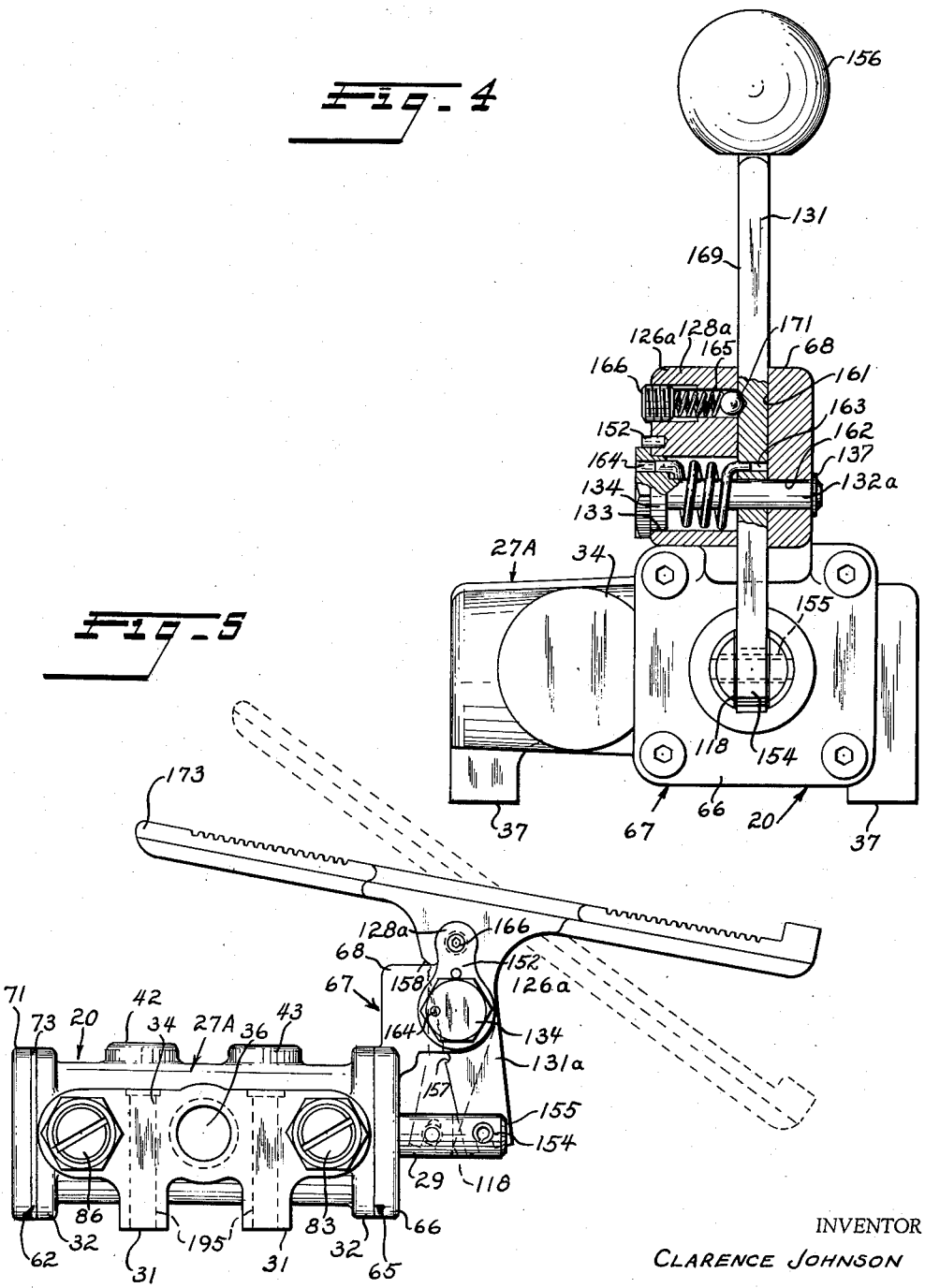
Figure 4 is a view similar to Figure 3 illustrating a modified form of hand actuated operating assembly applied to a four way valve of larger fluid capacity than that shown in Figures 2 and 3.
Figure 5 is a side view on a smaller scale of the four way valve of Figure 2 equipped with a foot treadle operator in place of the hand lever of Figure 2.

All of the four way valves are provided with longitudinally spaced pairs of drilled outlet ports 39 and 41 (Figure 1) formed in longitudinally spaced bosses 42 and 43 (Figures 1, 2 and 5). Bore 28 and the various ports 35, 36, 38, 39 and 41 are all suitably drilled and tapped to size on order so that a manufacturer can make up his anticipated requirements of basic valve bodies of each style, namely, two way, ¼" and ⅜" four way, ¼", ⅜" three way, ½" three way and ½" four way.

Drilled bore 28 extending from end to end of the body provides a surface finish satisfactory for receipt of suitably formed intermediate liner elements 45 (Figure 1) and desired mating end liner elements 46 and 47 (Figure 5). These liners are axially arranged in the desired order in bore 28 to form a longitudinally discontinuous guide bore 48 (Figure 1) for the desired valve spindle 29. To eliminate the need for a careful machined fit between bore 28 and the liners, the present invention contemplates that the liners be formed with one or more annularly enlarged ribs 51 each containing a ring groove and being of a diameter sufficiently less than that of bore 28 to assure a free sliding cooperation with bore 28 or even a slight clearance. As clearly seen in Figure 1, liners 45 are each provided with a pair of such grooved ribs 51 respectively disposed symmetrically on either side of a transverse plane passing through the longitudinal center of the liners. These paired ribs together with the annular wall 52 of reduced diameter therebetween define an annular recess 53 the purpose of which will be hereinafter pointed out.

The opposite ends of each liner 45 are identically formed to provide end extensions 54 of the same axial dimensions and identical configuration. These extensions 54 are adapted, when a pair of liners 45 are assembled in bore 28 with suitable spacer screens 55 therebetween, to define annular recesses 56 similar in length and depth to recesses 53 provided between pairs of ribs 51. Similar end extensions 54 are formed on the inner ends of end liners 47 to cooperate with the end extension of an adjacent liner 45 to form respective annular recesses 57 when similar screens 55 are disposed between the liners 45 and the respective end liners 47. The extensions 54 are formed with a radii at the intersection of the ends faces and the guide bore 48. Each liner 45 in longitudinally centered relation with respect to recess 53 is provided with a series of radial bores 59 the inner ends of which, at their intersection with bore 48 are also formed on a radii. The purpose of these radii will be hereinafter pointed out.

The end liners 47 are formed with a single annular grooved rib 51 and a transversely disposed end face.

When properly positioned in bore 48 with the required liners 45 and 47, the end face will be in the plane of the end face 62 of body member 27. By reference to Figure 1, it will be seen that liners 47 are also provided with a single ungrooved, annular rib 63 and that the axial length thereof terminates short of body face 65 to provide terminal extension 64 of reduced diameter adapted to protrude to, or if desired through and beyond the end face 65 of housing 27 to 27B. These protrusions, when they extend beyond end face 65, may receive and center the mounting plate 66 of an operating lever support bracket 67 and form therewith an annular ring groove the purpose of which will presently appear. Bracket 67 may take the form of that illustrated in Figure 1 but is preferably formed as illustrated in Figures 2 and 3 or Figures 4, 5, 6, 7, 8 and 9 in which the base plate, midway between a pair of opposed side edges and at a third side edge, is provided with an axially and radially extending overhanging support or bracket arm 68 of substantial lateral thickness.

To secure maximum utility out of the preferred form of bracket 67, the opposite end faces 62 and 65 of body member 27 are provided with equiangularly spaced, drilled and tapped screw openings 69, Figure 2, adapted to cooperate with similarly spaced tapped openings in base plate 66. As a consequence, bracket 67 may be located at either end (compare Figure 9 to the remaining figures) and in any one of a plurality of angular positions with respect to the body 27 so as to dispose bracket arm 68 and the selected operating lever in the most desirable position for operation. The end of each body member opposite that provided with bracket 67 is closed by a closure plate 71 secured thereto by suitable screws 72.

While cover plate 71 may directly engage the end 62 of body 27, it is preferred in the three and four way valve of Figures 2 through 9 that a sealing gasket 73 be interposed between the cover plate and the end of the body. It will be appreciated that the tapped openings 69 in end 62 of body member 27 are angularly disposed in exactly the same relation as the openings 69 of end face 65 so that the operating lever bracket member 67 may be selectively applied to either end of the body.

Referring for the moment to Figures 2 to 9, it is to be noted that the shape and size of the body end faces in all forms of bodies are of uniform shape and dimension. This is true irrespective of the rated size of the valve so that brackets 67 and cover plates 72 will be interchangeable in all forms and sizes of valves. As a result of this interchangeability, it will be appreciated that a manufacturer, dealer or distributor of the valves will not be required to stock varying sizes of cover members and bracket members for the various sizes and port arrangements of the standard lines of valves.

As clearly appears from Figures 1, 2 and 5 the four way valve on opposite sides of the longitudinally centered exhaust opening 36 are provided with tapped bores 81 and 82 closed by metering plugs 83 having tapered valve tips cooperating respectively with manifold passages, drilled through to bore 28 and counterbored in suitable fashion by a tool extending through openings 81 and 82 to form valve seats cooperating with their respective metering plugs 83. Each of the plugs 83 is suitably locked in adjusted position by means of lock nuts 86 in a manner well known to the art. By suitable adjustment of these metering plugs 83 the flow of fluid through the drilled manifold passages can be regulated to secure any desired rate of flow into the first mentioned manifold passage and out through the exhaust port 36. It will be appreciated, therefore, that the four way valves of this invention are designed to control fluid flow to regulate the rate of back and forth movement of the piston 25 of the servo-motor 23 or other device desired to be controlled.

It will further be appreciated that passages 81 and 82 can be merely plugged, in which event the four way valve can be used to merely vent the opposite sides of the servo-motor piston 25 to the exhaust port 36 without any flow restriction.

In order to provide the desired flow paths through the valves each of ring grooves 51 of the various liner elements 45 and 47 is provided with O-rings 87 formed of any suitable resilient material of suitable hardness adapted to support the liners 45 and 47 in bore 28 and seal the annular recesses 53 respectively from the recesses 56 and 57. These O-rings should preferably be of a durometer hardness of from 60 to about 80 to assure maintenance of a free floating relationship of the liner elements 45 and 47 in bore 28 while providing adequate sealing properties. As a result of this O-ring structure, the various annular recesses 53, 56 and 57 are respectively adapted to form annular passages connecting the interior bore 48 of the liner elements with one or the other of ports 35, 39, 41 or the manifold passages. Liner bore 48 receives the valve spool 29 and cooperates therewith to provide multiple passageways for conveying fluid from inlet 35 to one or the other of outlets 39, 41 while alternately venting ports 41 and 39 to the exhaust port 36 through the manifold passages. In order to seal the end of liner element 47 against fluid escaping through the mounting plate 66, the groove formed between annular rib 63 and the inner face of mounting plate 66 is provided with an O-ring 86 of 60 to about 80 durometer hardness which seals bore 28 and liner element 47 and is held in place by mounting plate 66.

Proper passage of fluid in bore 48 is assured by providing valve spool 29 with axially spaced valving lands flanked on either side by ring grooves adapted to respectively receive O-rings for slidingly supporting spindle 29 in bore 48 formed by the liner elements 45 and 47. The grooves at the inner end of each outboard land are preferably provided with O-rings of 90 durometer hardness designed to resist the tendency of these rings to blow out through the exhaust ports in high pressure usage. The grooves at the outer ends of these outboard lands are provided with O-rings 96 of 80 durometer hardness having a squeeze fit with bore 48 and a diameter to substantially fill their respective grooves so as to form a firm support for spindle 29. The support O-rings and O-rings 95 of 80 durometer hardness in the other grooves are free floating in their respective grooves and have an outer diameter only slightly greater (preferably by 5% to 8%) than the diameter of the guide bore 48. The width and depth of the receiving grooves for the 90 durometer hardness rings and rings 95 is approximately 10% greater than the cross-sectional diameter of the O-rings to assure a good sealing contact. As a result, actual sealing between the bore 48 of the liners and the spool 29 between the exhaust ports and the high pressure passages is effected by the 90 durometer hardness O-rings while the 80 durometer hardness O-rings 95 and O-rings 96 support the spool in its sliding movement and are primarily relied upon to seal the spindle ends against escape of leakage fluid or low pressure exhaust fluid only. In practice it has been found that a squeeze of .005 inch is satisfactory for most applications of O-rings 96 but a somewhat tighter or looser fit may be used.

Referring for the moment particularly to the spool position of Figure 1, high pressure fluid entering the inlet port 35 will pass into annular recess 56, through the screen in the bottom of recess 56 and into the interior of bore 48 to the left of the pair of rings 95, then along bore 48 in the space surrounding the reduced diameter stem of the spool 29, then outwardly through the liner passages 59 into the left hand annular passage 53 to the right of the lefthand spindle outboard land and through outlet port 39 leading to the left hand end of the servo-motor cylinder 34 as seen in Figure 1.

Assuming now that spool 29 is to be moved to its next operating position the desired movement would be effected by moving the spool to the left as seen in Figure 1. The next position would be that in which the respective lands overlie the open bottom walls of annular passages 56 and 57 respectively to cut-off all flow through the valve. As a consequence a highly effective valve shut-off position is provided by the valve of this invention.

The next operating position of the spool would be that placing the inlet passage 35 in communication with the right hand passage 53 leading to the opposite side of the servo-motor piston 25 through the port 41 and pipe 22. This position is reached by moving the spool 29 further to the left as viewed in Figure 1 to a position where the left hand outboard spindle land and its associated O-ring 94 lie wholly within the portion of bore 48 formed by the inner end of the leftmost end liner element, the intermediate spindle land and its associated O-rings 95 lie wholly within the left hand liner element 45 and the right hand outboard spindle land and its associated 90 durometer O-ring lie within the right hand end of the right hand liner element 45. The radii of extensions 54 and bores 59 provide for smooth passage of the various O-rings past bores 59 and the annular passages formed between the liner ends.

To avoid the possibility of an air trap at the left hand end of the spool 29 as its outboard land and its associated O-rings enter the leftmost liner element, the present invention contemplates that the sealing gasket 73 be provided with a radial slot leading outwardly to a point opposite the left hand end of the cored manifold passage to a drilled vent passage communicating with the cored manifold passage. This structure, it will be appreciated, will assure any trapped fluid to the left of spool 29 being vented directly to the manifold passage and exhaust port 36 so that no effective fluid locking of the spool can take place during movement of the spindle. In reversal of the spool movement this vent passage and slot will permit reverse flow of fluid from the manifold passage to the left hand end of the spool to prevent a vacuum lock upon reversal of the spool movement. Effective movement of the spool 29 between these various positions is accomplished through one or another of the lever operators carried by bracket 67 and now to be described.

Referring first to Figure 1, the arm 68 of bracket 67 is drilled radially inwardly from the top of arm 68 toward the spool bore to form a drilled opening 105 intersecting the spool bore. Opening 105 is restricted at its intermost end to captively receive a ball detent 106 a portion of which protrudes into the spool bore to cooperate with one or another of the ball detent grooves 107, 108 and 109 formed in the reduced end portion of the spool 29. Ball 106 is resiliently biased to its protruding position by a coil spring 111 held in place in bore 105 by a suitable abutment screw 112 inserted into the outer tapped end of drilled opening 105. The arm 68 of bracket 67 outwardly from drilled passage 105 is axially slotted at 113 to receive a shifter lever 114. Lever 114 is journalled on a pivot 115 carried by the bifurcated arms 116 formed at the opposite sides of the slots 113. One arm of the lever 114 depends from pivot 115 and terminates in a bifurcated end 117 received in an axial slot 118 formed in the outer end of the reduced end portion of spool 29. Bifurcated end 117 engages a cross pin 119 carried by the spool 29. In the position shown in Figure 1, the valve spool is in its extreme right hand position and ball 106 is engaged with annular groove 107 to retain the spool in this position. Assuming spool 29 is to be moved to the shut-off position, the rod 121 carried by the other arm 122 of lever 114 is moved in a clockwise direction around pivot 115 thereby forcing the spool 29 to the left and camming detent ball 106 back into drilled passage 105 until groove 108 is opposite the ball. When the groove 108 reaches a position opposite ball 106 spring 111 will project the ball into the groove and positively indicate to the operator that the next valve position has been reached. If desired the operator may leave the valve in this position or may merely pass the spool through this position to its next position in which groove 109 cooperates with ball 106. It will be appreciated, therefore, that the operator of Figure 1 provides a detent indication for the three valve positions and provides a simple and effective operating mechanism for the valve of Figure 1.

The bracket 67 of the present invention is preferably formed to support a lever operating mechanism adapted to automatically maintain the spool valve member 29 in a selected one of its several positions. One form of such automatic operator is illustrated in Figures 2 and 3 wherein the bracket arm 68 is axially slotted in parallel relation to the axis of spool 29 as indicated at 125 and provided with oppositely facing cylindrical bosses 126 and 127 having upstanding ears 128 and 129 disposed at opposite sides of slot 125. Bosses 126 and 127 mount an operating lever 131 and associated biasing mechanism. As clearly seen in Figure 3, lever 131 is carried on a pivot pin 132 which is in turn supported in an enlarged cross bore 133 intersecting slot 125 by means of a shouldered disc 134 disposed in one of the outer ends of bore 133 with its hexagon shaped head 135 abutting the outer face of boss 126 and the shouldered hexagon head 136 of pin 132 abutting the outer face of boss 127. Axial movement of disc 134 along pin 132 is prevented by a snap ring 137 cooperating with a groove in pin 132 and the outer face of disc 134 in well known manner.

Pin 132 at opposite sides of lever 131 pivotally supports respective levers 138 and 139 the upper ends of which are formed with integral upwardly extending fingers 140 and 141 disposed respectively adjacent the edges 142 and 143 of lever 131. A pin 144 carried by lever 141 respectively engages fingers 140 and 141 depending upon the direction of movement of lever 131 around pip 132 as will be presently pointed out. Respective stop pins 145 and 146 are mounted in the ears 128 and 129 of bracket arm 68 with their axes lying in the vertical plane containing the axis of pin 132 and their inner ends projecting into the slot 125 and terminating short of the side faces of the lever 131. These stop pins abut the respective fingers 140 and 141 to limit movement of the levers 138 and 139 in one direction. Each of the levers 138 and 139 opposite the inner ends of the bores 133 are provided with drilled passages 147 adapted to receive the terminal inner ends of respective coil springs 148 housed in the aligned portions of bore 133 and having their opposite terminal ends disposed in drilled passages 149 and 151 provided respectively in mounting disc 134 and head 136 of pin 132. These springs 148 are respectively tensioned during assembly of the lever mechanism by turning the head 136 of pin 132 and its associated disc 134 in the desired direction until suitable tension is built up in the spring. The tensioned position of head 136 and disc 134 is maintained by inserting lock pins 152 and 153 into apertures provided in the face of bosses 126 and 127 in position to be in the path of the corners of the hex heads of pin 132 and disc 134. Each of the pins 152 and 153 has a force fit in its aperture so as to prevent it from accidental dislodgement.

As clearly seen in Figures 2 and 3, the lower end of lever 131 extends downwardly terminating in a bifurcated terminal end 154 received in axial slot 118 of spool 29 with the bifurcations in turn receiving between them a roll pin 155 carried by spindle 29 and extending across slot 118. The upper end of lever 131 is preferably provided with a hand gripping ball 156 of hard rubber or the like to provide a suitable grip for operating the lever 131. While the springs 148 and their tensioned levers 137 and 138 may be tensioned to maintain the spool 29 in any one of its three positions, the present embodiment contemplates that the lever 131 be maintained in position to dispose spool 29 in its intermediate or full shut-off position shown in solid lines in Figure 2 and generally designated as the "neutral" position. This neutral position is secured by reason of the tensioned levers 138 and 139 respectively engaging the opposite ends of pin 144 on opposite sides and forcing the pin 144 and lever 131 into vertically centered relation with respect to stop pins 145 and 146 in a manner that will be clear from an inspection of Figure 2.

Assuming that operation of the valve to supply fluid through ported boss 42 is desired, lever 131 will be moved counterclockwise around pin 132 to thereby move spool valve 29 to the right as seen in Figure 2 to vent boss 43 to the exhaust port 36 and connect boss 42 to the inlet port 35 in the manner previously pointed out. So long as lever 131 is held in this position agianst the biasing force of lever 139 and its associated spring 148 fluid flow is assured through boss 42. Upon release of the lever 131, lever 139 and its associated spring 148 will drive lever 131 in a clockwise direction until finger 141 of lever 139 engages its stop pin 146. Shifting of the valve to supply fluid through boss 43 is effected by clockwise movement of lever 131 around pivot 132 to move spool 29 to the left as seen in Figure 2 to connect inlet port 35 and the port in boss 43 as heretofore described and to vent the port in boss 42 to the exhaust port 36. Upon release of the lever 131, tensioned lever 138 and its spring will drive lever 131 in a counterclockwise direction until finger 140 of lever 138 engages its stop pin 145. In order to limit the clockwise and counterclockwise movement of the arm 131 to assure proper positioning of the valve, lever 131 at points 157 and 158 is notched to respectively engage the upper and lower corners of bracket arm 68 formed by the intersection of the base wall of slot 125 and the top and bottom surfaces of bracket arm 68. It will be appreciated from the description just given that the valve of Figures 2 and 3 provides a convenient "neutral" return four way valve in which the valve operating mechanism is readily accessible and may be conveniently replaced and repaired without dismantling any portion of the valve proper.

Referring next to Figure 4, there is disclosed a four way one-half inch valve in which the bracket 67 is modified slightly from that shown in Figures 2 and 3. In this form of the invention the bracket arm 68 is formed with a slot 161 of a width sufficient to just freely receive lever 131 and a single boss 126a. The wall of arm 68 at the side of slot 161 opposite that containing boss 126a is drilled as indicated by numeral 162 to a diameter to receive the shank of headed and shouldered pivot pin 132a and the boss 126a, while provided with a coaxially aligned bore 133, is not provided with a return spring. In lieu of ears 128 and 129 and stop pins 145 and 146 of the previous embodiment of the invention, the present embodiment provides an upstanding ear 128a having a drilled ball receiving opening 165 the outer end of which is counterbored and threaded to receive a spring abutment screw 166 adapted to retain a ball detent spring 167 and a detent ball 168 therein for engagement with the side face 169 of lever 131. Lever 131 is notched as indicated at 171 at the lateral midpoint of face 169 to provide a detent notch for determining the "neutral" position of the lever and its associated spool valve 29. In this form of the invention, the head of pin 132a is assembled with the lever 131 and spool valve 29 in neutral position and the disc securing pin 152 is driven home so as to lie agianst a face of head to restrain pin 132a against rotational movement when lever 131 is moved. In this form of the invention, manual force sufficient to overcome the holding effect of the detent ball moves lever 131 in either a clockwise or counterclockwise direction as desired to move the valve to either of its operative positions or its "neutral" position.

Referring now to Figure 5, a four way three-eighths inch valve is shown equipped with a bracket member 67 similar to that just described in connection with Figure 4. The operating lever 131a in this embodiment is provided with a foot treadle 173 in lieu of the hand controlling knob. The lower arm of lever 131a of this form of the invention is identical to that heretofore described in connection with Figure 4 and the foot treadle 173 is integrally formed on the upper arm as will be clear from the drawing. However, the ball detent 171 and its spring is omitted and a return spring 148 is provided and tensioned, as will appear from the different location of the spring pole 164 in Figure 5, in a direction to bias the lever 131a and treadle 173 to the outermost position of spool 29 for supplying pressure fluid to the port in boss 42 and venting the port in boss 43 to the exhaust port 36 through the manifold chamber 37 as previously pointed out. The position of spool 29 in Figure 5 corresponds to that shown in Figure 1 so that upon rocking movement of the treadle 173 in a clockwise direction around pivot pin 132 and spool 29 will be successively moved to the intermediate "neutral" position and then to the other extreme position in which the port in boss 42 is vented through the exhaust port 36 and the port in boss 43 is connected to the fluid inlet 35. Release of the foot treadle in this form of the invention results in counterclockwise movement of the lever 131 around pivot pin 132 to return the spool valve 29 to the position shown in Figure 5. It will thus be clear that the lever mechanisms of this invention, by simple selection and adjustment of the tension of springs 148 and appropriate use or non-use of ball detents can either be set to bias the valve to anyone of the three normal operating positions or to serve as a full manual valve.

Referring next to the operating mechanism disclosed in Figures 6 and 7 of the drawings, there is illustrated a one-half inch four way valve provided with a bracket member 67 in all respects identical to that just referred to in connection with Figure 5, including the tensioning of spring 148 to normally bias the spool 29 at its extreme right hand position. In this form of operating mechanism, the lower arm of the shaft 131b again is provided with bifurcated end portion 154 but the upper end is provided with a right angularly extending arm 175 which is itself bifurcated at its outer end to provide laterally spaced arms 176 and 177. These arms are suitably apertured to receive the opposite ends of a roll pin 178 provided to journal a cam roller element 179 thereon. This particular operating mechanism through the cam roller element 179 is adapted for machine operation rather than foot operation as previously pointed out in connection with Figure 5.

Referring next to Figure 8, a four way one-half inch valve equipped with a bracket member 67 identical to that described in connection with Figure 5 is again illustrated. In this form of the invention, the spring 41 is tensioned as previously described in connection with Figures 6 and 7 and the operating lever 131c with a lower bifurcated end 154 as heretofore described is provided with a right angularly disposed arm 181 terminating at its outer end in a toe pad 182 for effecting its operation. In all other respects, the operating mechanism of this embodiment is identical to that heretofore described in connection with Figures 6 and 7.

Turning now to Figure 9, there is disclosed a one-half inch three way valve made from a body 27b in the manner heretofore described. The liners 45 and 47 and the spool valves 29a of this form of the invention function substantially like those of the four way valves heretofore described. However, the end cover plate assembly 71a of this form of the invention is provided with a breather opening 186 and containing a suitable packing 187 for venting the inner end of the spool 29a since there is no manifold passage and vent passage in these three way valves. This breather opening and packing, it will be appreciated, is drilled in the standard coverplate 71 at the time the cover plates are applied to use on the three way valve structures. It, accordingly, will be seen that the same cover plate suffices for all valves.

As clearly appears from Figure 9 the three way valves are admirably suited for operation with the identical operating mechanisms heretofore described in connection with the four way valves since these three way valves have three spool operating positions also. The extreme right hand position shown in Figure 9 supplies fluid from inlet opening 35 to the right hand outlet port while the left hand outlet is completely shut-off.

The "neutral" position of this valve spool 29a is obtained by placing lever 131 in its intermediate upright position so the spool will cut off both outlet ports so that the high pressure fluid entering from inlet port 35 is again confined between the two spaced 90 durometer outboard land seal rings.

The third position of the spool valve 29a of the three way valves of this invention is the extreme left hand position. The operator, as disclosed in Figure 9, has its spring 148 wound so as to bias the spool valve 29a to its extreme right hand. It, however, will be clear from the preceding description that proper biasing of this valve could be effected to normally bias the spool valve to either one of the other positions if desired.

In all forms of the valves drilled openings 195 extending at right angles to the support faces of feet 31 and clear through the valve body are provided for the mounting screws.

While a one piece spindle of the type heretofore illustrated may be effectively employed in any of the valves of this invention, great assurance against a blowout of seal rings in high pressure usage where the pressure differential is unduly high on the ring between the inlet and exhaust porting is provided by the novel multi-part spool of my copending application Serial No. 731,563, filed April 25, 1958, as a division of this application and entitled "Spool Valve O-Ring Sealed Spool."

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A selectively positionable valve operating assembly for attachment to the housing of an axially sliding, freely rotatable spool type valve comprising a plate-like base having a centered aperture to freely pass an end of the sliding spool and a plurality of equi-angularly spaced screw openings disposed radially outwardly of the centered aperture of said base for receiving mounting screws to secure said assembly to said housing in any one of a plurality of selected angular positions; a mounting bracket on said base protruding away from one face of said base and terminating adjacent one edge of said base in an enlarged body portion having a slot extending therethrough at right angles to said one face of said base with its opposite side walls paralleling a plane containing the center of the centered aperture of said base; a cross passage in said body intersecting said slot at right angles; a pivot pin mounted in said cross passage in spanning relation to said slot; a manual valve operating lever mounted on said pivot pin for pivotal movement around the axis of said pivot pin and having an arm extending transversely of said centered aperture in axially spaced relation to said one face of said base and adapted to be coupled to said valve spool end for axially shifting said valve spool; and resilient means for predetermining at least one position of said operating lever and valve spool.

2. The valve operating assembly of claim 1 wherein said position determining means comprises a passage in said body portion intersecting said slot, a spring pressed captive ball in said passage having a portion normally protruding into said slot, a mating ball socket formation on the side face of said operating lever adapted to receive said normally protruding portion of said ball, an enlarged bore in said body portion at one side of said slot in coaxial relation to said cross passage, a coil spring disposed in said bore with one end fixed with respect to said body portion and the other end fixed with respect to said valve operating lever and operative, upon release after pivotal movement of said lever from the normal lever position to tension said coil spring, to return said lever and said valve spool to said one position.

3. The valve operating assembly of claim 1 wherein said cross passage is of substantially greater diameter than said pivot, said pivot pin is supported in coaxial relation to said cross passage and wherein said position determining means establishes a neutral position of said valve spool and comprises a pair of return levers respectively mounted on said pivot pin each on a respective side of said operating lever and each having an upstanding arm of substantially less width than said operating lever, said respective arms being disposed along opposite edges of said operating lever, a pick-up pin carried by said operating lever in radial outward relation to said pivot pin in position to engage and pick up one or the other of said stop levers depending upon the direction of movement of said operating lever, a coil spring respectively disposed in the portions of said cross passage at each side of said slot each spring having one end fixed with respect to its one of said pair of return levers and the other end fixed with respect to said body portion, one of said springs being tensioned upon movement of its related return lever in response to operating lever movement in one direction to condition said spring and related return lever for restoring said operating lever and valve means to neutral position and the other of said springs and its related return arm being similarly conditioned upon movement of said operating lever in the opposite direction for restoring said operating lever and valve means to neutral position.

4. The valve operating assembly of claim 3 together with stop pins carried by said body portion and extending from opposite sides of said slot respectively into the path of movement of a respective return lever to respectively limit the movement of said operating lever in said one direction and in said other direction whereby the other positions of said operating lever and valve means are positively predetermined.

References Cited in the file of this patent

UNITED STATES PATENTS

| | | |
|---|---|---|
| 912,717 | Murphy | Feb. 16, 1909 |
| 1,288,811 | Birrell | Dec. 24, 1918 |
| 1,425,088 | Hayes | Aug. 8, 1922 |
| 1,515,998 | Clark | Nov. 18, 1924 |
| 1,741,190 | Kessel | Dec. 31, 1929 |
| 2,136,751 | Nampa | Nov. 15, 1938 |
| 2,295,111 | Hemmings | Sept. 8, 1942 |
| 2,342,450 | Campbell | Feb. 22, 1944 |
| 2,459,012 | Barth | Jan. 11, 1949 |
| 2,505,106 | Finch et al. | Apr. 26, 1950 |
| 2,536,727 | Crawley | Jan. 2, 1951 |
| 2,541,951 | Twyman | Feb. 13, 1951 |
| 2,610,022 | Meddock | Sept. 9, 1952 |
| 2,630,135 | Johnson | Mar. 3, 1953 |
| 2,749,769 | Slomer | June 12, 1956 |

FOREIGN PATENTS

| | | |
|---|---|---|
| 887,150 | Germany | July 8, 1949 |